US006567208B1

(12) United States Patent
Shi et al.

(10) Patent No.: US 6,567,208 B1
(45) Date of Patent: May 20, 2003

(54) AMPLIFICATION OF A C-BAND AND L-BAND OF A OPTICAL SIGNAL USING A COMMON LASER SIGNAL

(75) Inventors: Chao-Xiang Shi, Milpitas, CA (US); Li-Ping Chen, Foster City, CA (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 09/558,034

(22) Filed: Apr. 25, 2000

(51) Int. Cl.[7] .................................................. H01S 3/00
(52) U.S. Cl. .................. 359/341.32; 359/349
(58) Field of Search ............................ 372/3, 334, 337; 359/341.1, 341.3, 349

(56) References Cited

U.S. PATENT DOCUMENTS

| 5,905,838 A | * | 5/1999 | Judy et al. ................... 385/123 |
| 6,049,417 A | * | 4/2000 | Srivastava et al. ........... 359/341 |
| 6,049,418 A | * | 4/2000 | Srivastava et al. ........... 359/341 |
| 6,101,024 A | * | 8/2000 | Islam et al. ................... 359/334 |
| 6,104,527 A | * | 8/2000 | Yang ............................. 359/341 |
| 6,359,728 B1 | * | 3/2002 | Angellieri et al. ........... 359/345 |
| 6,362,911 B1 | * | 3/2002 | Lee et al. ..................... 359/127 |

OTHER PUBLICATIONS

Sun et al., "A Gain–Flattened Ultra Wideband EDFA for High Capacity WDM Optical Communications Systems", ECOC'98, Sep. 20–24, 1998, pp. 53–54.*
Suzanne Lacroix, "WDM designed for erbium–doped fiber applications," http://ofl.phys.polymtl.ca/Fibers_html/node34.html, p. 1–2, (1996).
Kazushige Yonenaga and Yutaka Miyamoto, "Dispersion--managed high–capacity WDM systems using zero–dispersion–flattened transmission line," FD4–1, Proceeding of OFC–IOOC 1999, San Diego, California, p. 71–73.

R.W. Tkach, A.R. Chraplyvy, Fabrizio Forgheiri, A.H. Gnauck, and R.M. Derosier, "Four–Photon Mixing and High–Speed WDM Systems," Journal of Lightwave Technology, IEEE, vol. 13 (No. 5), p. 841–849, ( May 1995).

H.Bulow, D.Schlump, J.Weber, B.Wedding, R.Heidemann, "Electronic equalization of fiber PMD–induced distortion at 10 Gbit/s," OFC '98 Technical Digest, p. 151–152, 1998.

A. K. Srivastava, L. Zhang, Y. Sun, J. W. Sulhoff, and C. Wolf, "System margin enhancement with Raman gain in Multi–span WDM transmission," FC2–1, Proceeding OFC–IOOC 1999, OFC '99 Technical Digest, (Feb. 26, 1999).

* cited by examiner

Primary Examiner—Thomas G. Black
Assistant Examiner—Deandra M. Hughes
(74) Attorney, Agent, or Firm—Harley R. Ball; Steven J. Funk; Kevin D. Robb (57) ABSTRACT

A fiber optic system implementing an amplification system is disclosed that provides distributed optical amplification through remote pump technology. The fiber optic system is comprised of a transmitting system, an amplification system, and a receiving system. The amplification system is comprised of a signal processing system and a laser system. The transmitting system transmits an optical signal that includes a C-band and L-band to the signal processing system. Concurrently, the laser system receives a single laser signal and transfers the single laser signal to the signal processing system. The signal processing system receives the single laser signal and the optical signal that includes the C-band and L-band, and combines the optical signal and the single laser signal to amplify the C-band and L-band of the optical signal.

16 Claims, 6 Drawing Sheets

FIG. 6

AMPLIFICATION OF A C-BAND AND L-BAND OF A OPTICAL SIGNAL USING A COMMON LASER SIGNAL

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to the field of fiber optic systems, and in particular, to an amplification system that amplifies a C-band and L-band of an optical signal using a laser signal.

2. Description of the Prior Art

Fiber optic systems transfer data over optical fibers. Designers of fiber optic systems try to increase the capacity of the system to accommodate more data traffic and the Internet. Wavelength Division Multiplexing (WDM) increases the capacities of the fiber optic system. WDM passes multiple data channels over one or more wavelengths of light simultaneously over a single fiber. To further increase the fiber optic system capacities, high-speed data transfers are used. The high-speed data transfers require high-power optical signals.

Currently, amplifiers supply the optical signals with sufficient power for the high-speed data transfers. The amplifiers include boost amplifiers, line amplifiers, and pre-amplifiers. A problem with the current fiber optic systems is that as the amplifiers increase the power of the optical signals, impairments affecting the optical signals increase due to non-linearities in the fiber. The impairments cause errors in the fiber optic system and increase a Signal to Noise Ratio (SNR) and an overall Bit Error Rate (BER) of the system.

One solution to the above problem is a distributed optical amplification system that uses remote pump technology. A remotely pumping laser coupled to a conventional transmission fiber can amplify certain wavelengths of optical signals traveling over the fiber. The pump laser replaces some conventional amplifiers in the system and decreases the required output power level of the remaining amplifiers. The laser signal at a wavelength of 1480 nm amplifies signals traveling in a range of wavelengths of approximately 1565 nm–1600 nm. The range of wavelengths of 1565 nm–1600 nm is referred to as the L-band. The laser signal amplifies the L-band due to a Raman effect. The Raman effect causes an increase in a gain of a wavelength of light traveling over a transmission fiber when a light wave, such as the laser signal, of a lower wavelength is concurrently transmitted over the fiber. The Raman effect is well known in the art. Unfortunately, the pump laser only amplifies the L-band and does not amplify signals in the other wavelengths.

A second laser signal at a wavelength of 1400 nm amplifies signals traveling in a range of wavelengths of approximately 1525 nm–1560 nm. The range of wavelengths of 1525 nm–1560 nm is referred to as the C-band. The laser signal amplifies the C-band due to the Raman effect. Unfortunately, the amplification system requires two high-powered pump lasers to amplify the C-band and L-band. The high-powered lasers increase the overall cost of the fiber optic system.

SUMMARY OF THE INVENTION

An amplification system that amplifies a C-band and L-band in an optical signal using a single laser signal solves the above problems. The amplification system is comprised of a signal processing system and a laser system. The laser system receives the laser signal and transfers the laser signal to the signal processing system. The signal processing system receives the optical signal that includes the C-band and L-band and the laser signal, and combines the optical signal and the laser signal to amplify the C-band and L-band of the optical signal. The amplification system transfers the optical signal that includes an amplified C-band and L-band. Advantageously, the amplification system amplifies the C-band and L-band with the single laser signal instead of two laser signals.

In one embodiment of the amplification system, the signal processing system is comprised of a splitter coupled to a coupler by a first fiber and a second fiber. The first fiber is an Erbium-doped fiber. The second fiber is a conventional transmission fiber. The laser system is comprised of a pump laser coupled to the coupler. The splitter splits an optical signal that includes the C-band and L-band and transfers the optical signal over the first fiber and the second fiber. The pump laser generates a single laser signal and transfers the laser signal through the coupler and over the first fiber and the second fiber in an opposite direction of the optical signal. In the first fiber, the optical signal and the laser signal combine to amplify the C-band of the optical signal based on the Erbium properties of the first fiber. In the second fiber, the optical signal and the laser signal combine to amplify the L-band of the optical signal based on a Raman effect. The amplification system in this embodiment is an advance because it amplifies both the C-band and L-band of the optical signal using the laser signal. The amplification system reduces the need for conventional amplifiers and reduces the output power needs of remaining amplifiers.

In another embodiment of the amplification system, the signal processing system is comprised of a section of Erbium and Phosphorus doped fiber and a section of conventional transmission fiber. The laser system is comprised of a pump laser coupled to the signal processing system. The pump laser transmits a single laser signal over the Erbium and Phosphorus doped fiber and the transmission fiber in an opposite direction of an optical signal that includes the L-band. In the section of Erbium and Phosphorus doped fiber, the optical signal and the laser signal combine to amplify the L-band of the optical signal based on the properties of the section of Erbium and Phosphorus doped fiber. In the transmission fiber, the optical signal and the laser signal combine to amplify the L-band of the optical signal based on the Raman effect. The amplification system in this embodiment produces a flatter gain shape for the L-band and eliminates the need for a gain equalization filter.

DETAILED DESCRIPTION OF THE INVENTION

Figure 1:
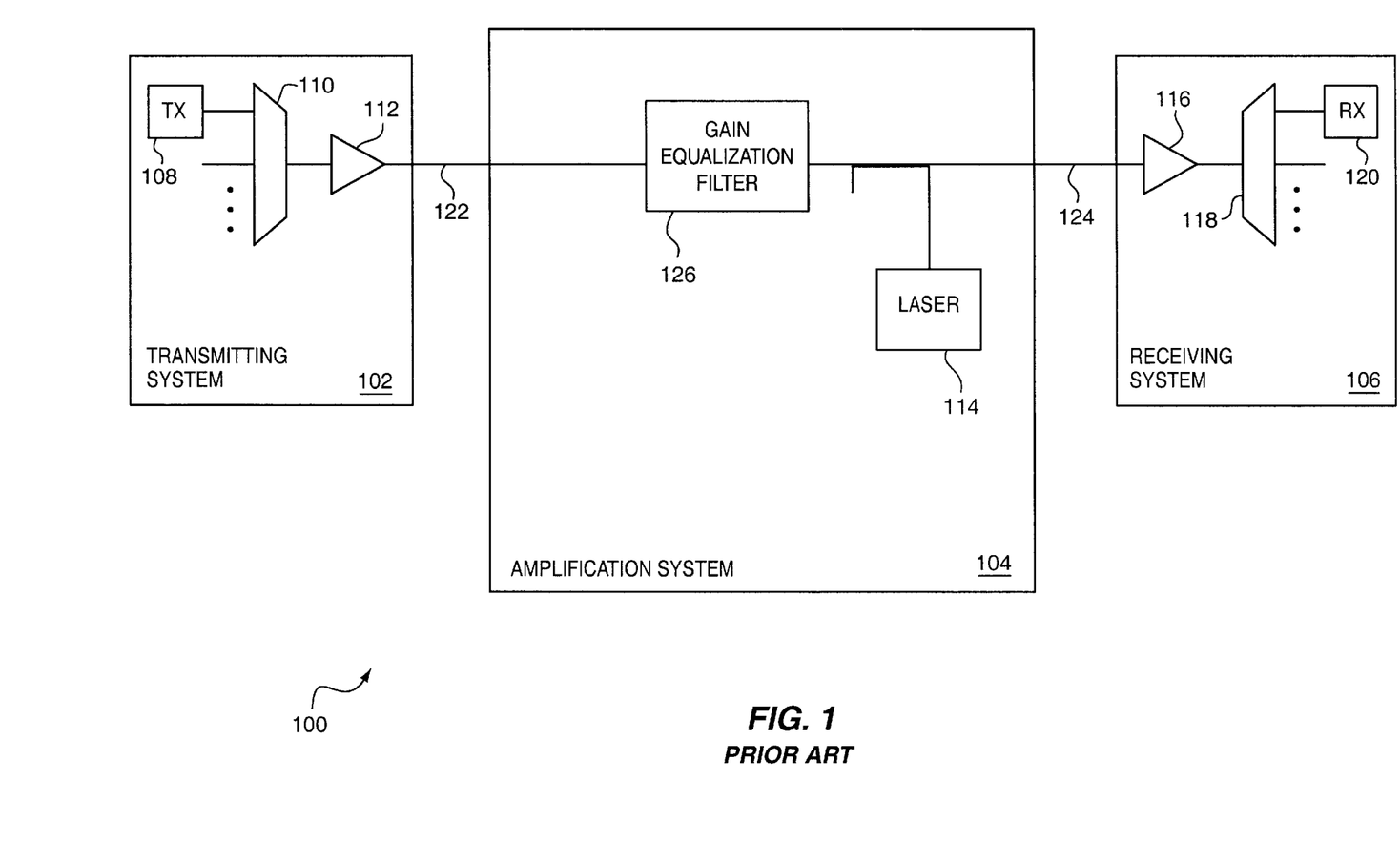
FIG. 1 is a block diagram depicting a fiber optic system that amplifies an L-band of an optical signal using a pump laser in the prior art.

In order to better understand the invention, a further explanation of the prior art is disclosed. FIG. 1 shows a fiber optic system 100 comprised of a transmitting system 102, an amplification system 104, and a receiving system 106 in the prior art. In operation, a transmitter 108 transmits a first channel signal to a multiplexer 110. The first channel signal is a signal transmitted over a channel in the L-band. Multiplexer 110 receives the first channel signal along with other channel signals in the L-band. Multiplexer 110 multiplexes the first channel signal and the other channel signals to generate an optical signal that includes an L-band. Multiplexer 110 transfers the optical signal to an L-band Erbium-Doped Fiber Amplifier (EDFA) 112. L-band EDFA 112 amplifies the optical signal and transfers the optical signal over a fiber 122. L-band EDFA 112 is a discrete fiber amplifier, such as a Tellurite based EDFA or an Erbium fiber co-doped with Phosphorus and Aluminum. Concurrently, a pump laser 114 transmits a 1480 nm laser signal over a fiber 124 through a gain equalization filter 126 and over fiber 122 in an opposite direction of the optical signal. The laser signal and the optical signal combine in fiber 122 to amplify the L-band of the optical signal. The combining of the laser signal and the optical signal is based on a Raman effect. The Raman effect is well known to those skilled in the art.

Gain equalization filter 126 receives and filters the optical signal that includes an amplified L-band to flatten the gain shape of the L-band. Gain equalization filter 126 transfers the optical signal to an L-band EDFA 116 over fiber 124. L-band EDFA 116 is a discrete fiber amplifier, such as a Tellurite based EDFA or an Erbium fiber co-doped with Phosphorus and Aluminum. L-band EDFA 116 amplifies the optical signal and transfers the optical signal to a de-multiplexer 118. De-multiplexer 118 separates the first channel signal out of the optical signal and transfers the first channel signal to a receiver 120.

A C-band of the optical signal could be amplified in a similar fashion. A 1400 nm pump laser substituted for pump laser 114 in FIG. 1 would amplify the C-band of the optical signal. C-band amplification and L-band amplification require separate laser signals of different wavelengths.

Amplification system 104 effectively amplifies the L-band of the optical signal and reduces the number of conventional amplifiers used to boost the optical signal. Alternatively, amplification system 104 could amplify the C-band of the optical signal. With the pump laser amplifying the L-band, the amplifiers still used in the system 100 can be designed to have a low output power, a low gain, a fiber non-linearities can be reduced and system SNR performance can be improved. A problem with amplification system 104 is pump laser 114 does not effectively amplify wavelengths outside of the L-band. In order to amplify wavelengths outside of the L-band, more pump lasers need to be added.

Figure 2:
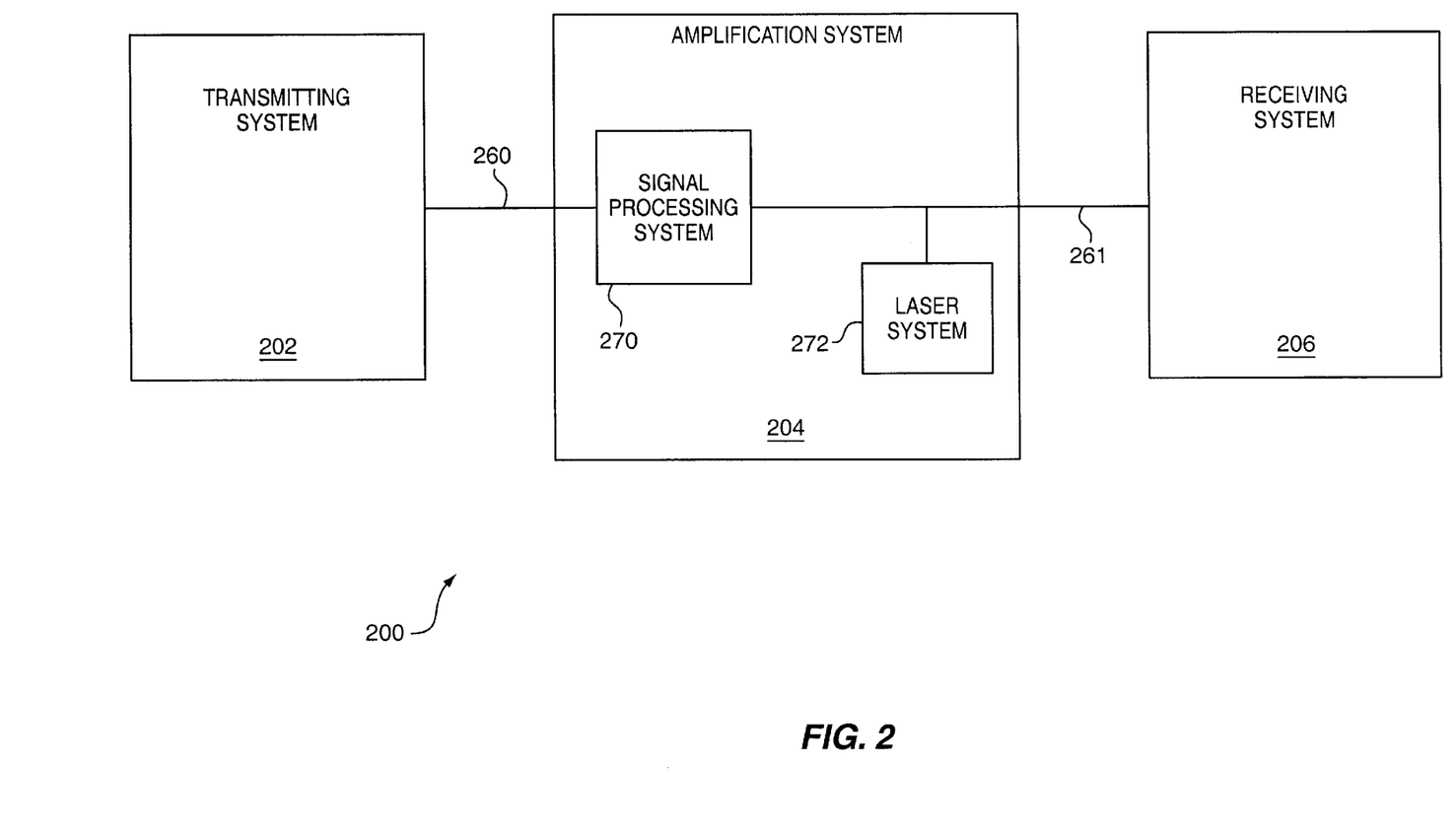
FIG. 2 is a block diagram depicting a fiber optic system comprised of a transmitting system, an amplification system, and a receiving system in an example of the invention.

Fiber Optic System Configuration and Operation—FIG. 2

FIG. 2 depicts an example of a fiber optic system 200 implementing an amplification system 204 in accord with the present invention. Fiber optic system 200 is comprised of a transmitting system 202, amplification system 204, and a receiving system 206. Amplification system 204 is comprised of a signal processing system 270 and a laser system 272. Transmitting system 202 is coupled to signal processing system 270 by a fiber 260. Signal processing system 270 is coupled to receiving system 206 by a fiber 261. Laser system 272 is also coupled to fiber 261.

Fiber optic system 200 utilizes Wavelength Division Multiplexing (WDM) to transmit signals over separate wavelengths. Transmitting system 202 is configured to transmit an optical signal that includes a C-band and L-band. The C-band refers to a range of wavelengths of approximately 1525 nm–1560 nm. The L-band refers to a range of wavelengths of approximately 1565 nm–1600 nm. Laser system 272 is configured to receive a single laser signal. Signal processing system 270 is configured to receive the optical signal that includes the C-band and L-band, receive the laser signal from laser system 272, combine the optical signal and the laser signal to amplify the C-band and L-band of the optical signal, and transfer the optical signal that includes an amplified C-band and L-band. The receiving system 206 is configured to receive the optical signal that includes the amplified C-band and L-band.

In operation, transmitting system 202 transmits the optical signal the includes the C-band and the L-band to signal processing system 270 over fiber 260. Signal processing system 270 receives the optical signal that includes C-band and L-band from the transmitting system 202. Concurrently, laser system 272 receives the single laser signal and transfers the laser signal to signal processing system 270 over fiber 261. Signal processing system 270 combines the optical signal and the laser signal to amplify the C-band and L-band of the optical signal. Signal processing system 270 transfers the optical signal that includes the amplified C-band and L-band to receiving system 206 over fiber 261.

This example depicts a single span configuration. A span is a length of fiber between two fiber amplifiers. In a multiple-span network, amplification system 204 is implemented on each span.

Amplification system 204 advantageously amplifies both the C-band and L-band of the optical signal using the single laser signal. Amplification system 204 eliminates the need for two pump lasers to amplify the C-band and L-band, which reduces the cost of fiber optic system 200. Amplification system 204 further reduces the number of conventional amplifiers needed to amplify the C-band and L-band of the optical signal.

Figure 3:
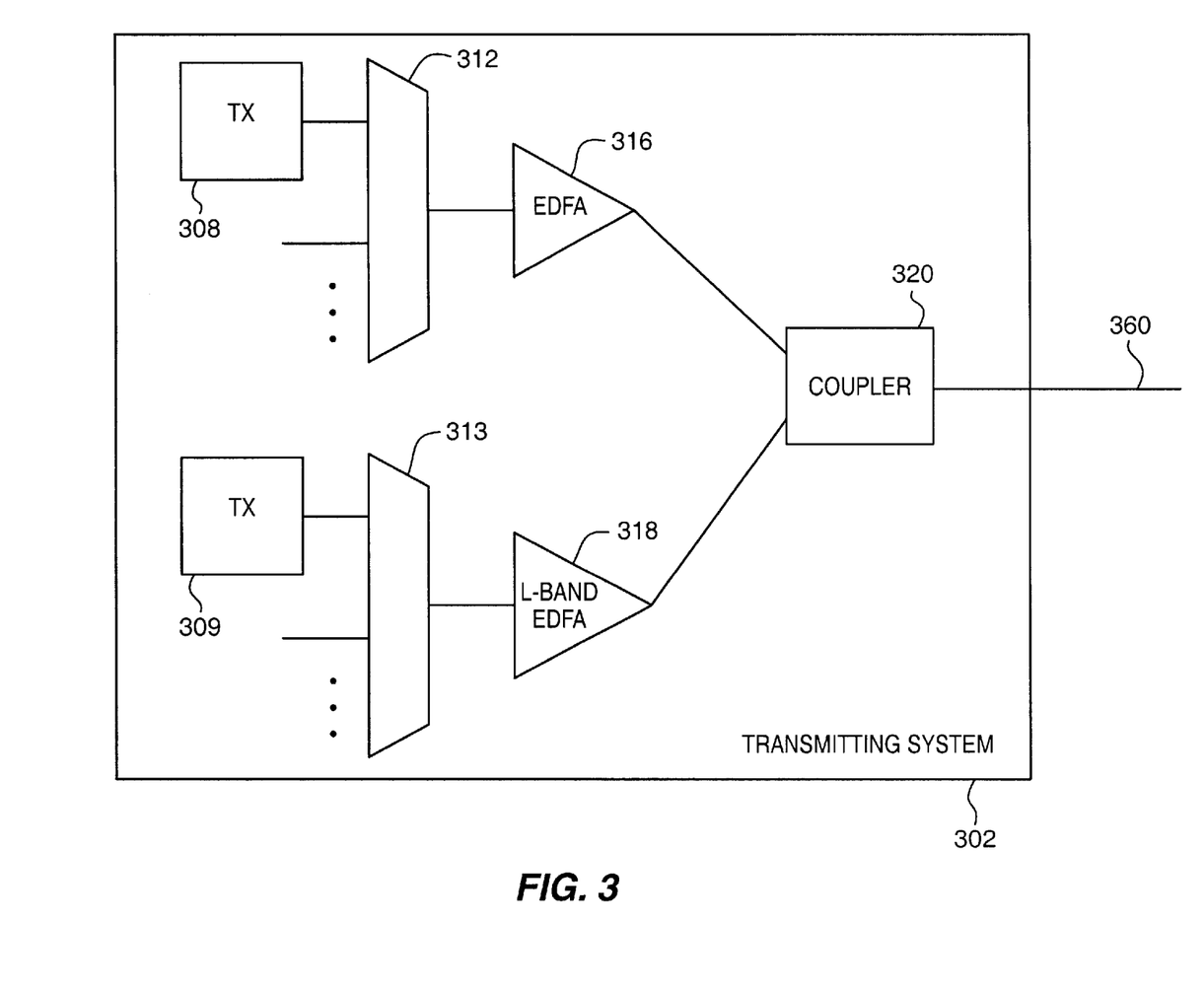
FIG. 3 is a block diagram depicting a transmitting system in an example of the invention.
Figure 4:
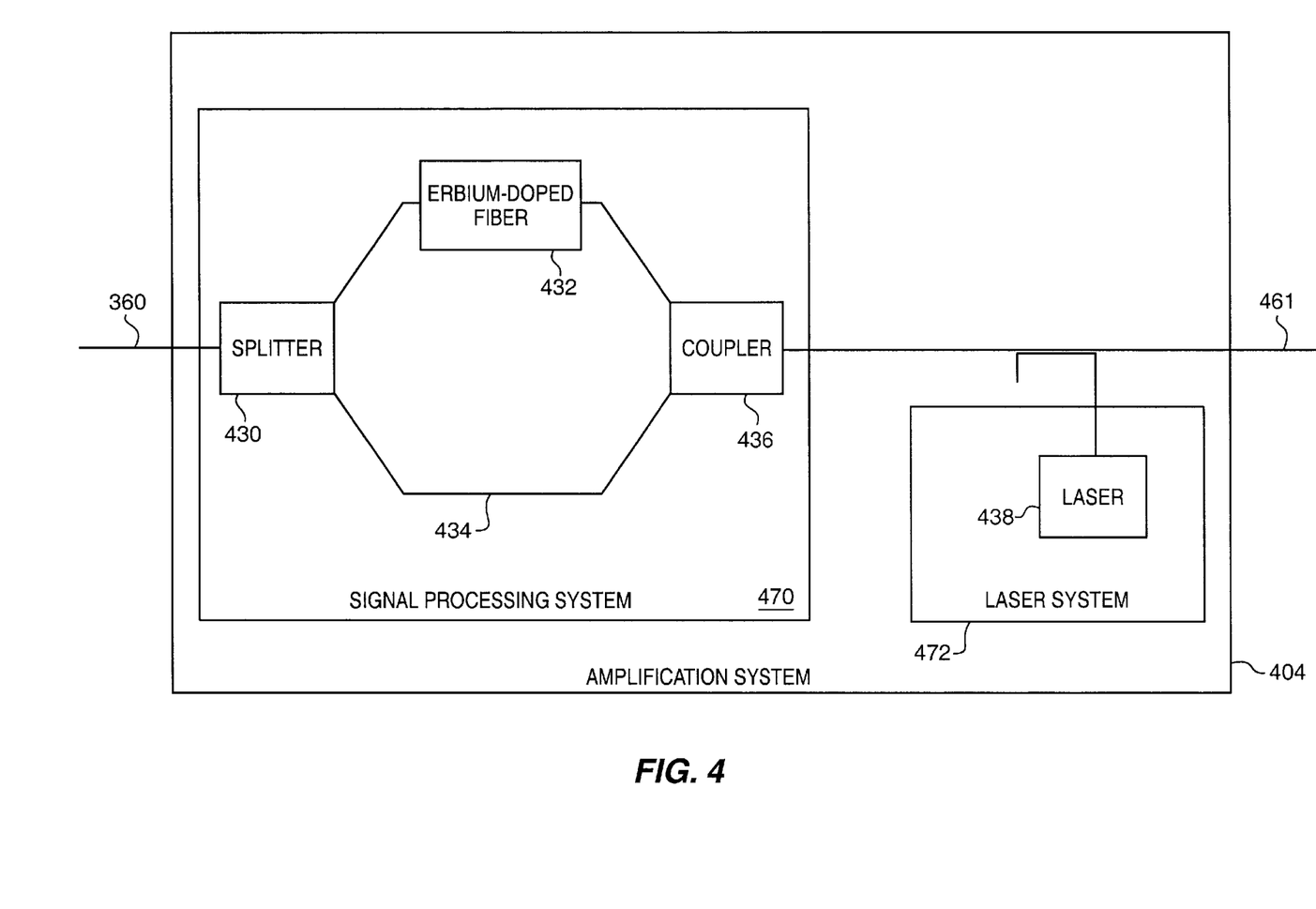
FIG. 4 is a block diagram depicting an amplification system in an example of the invention.
Figure 5:
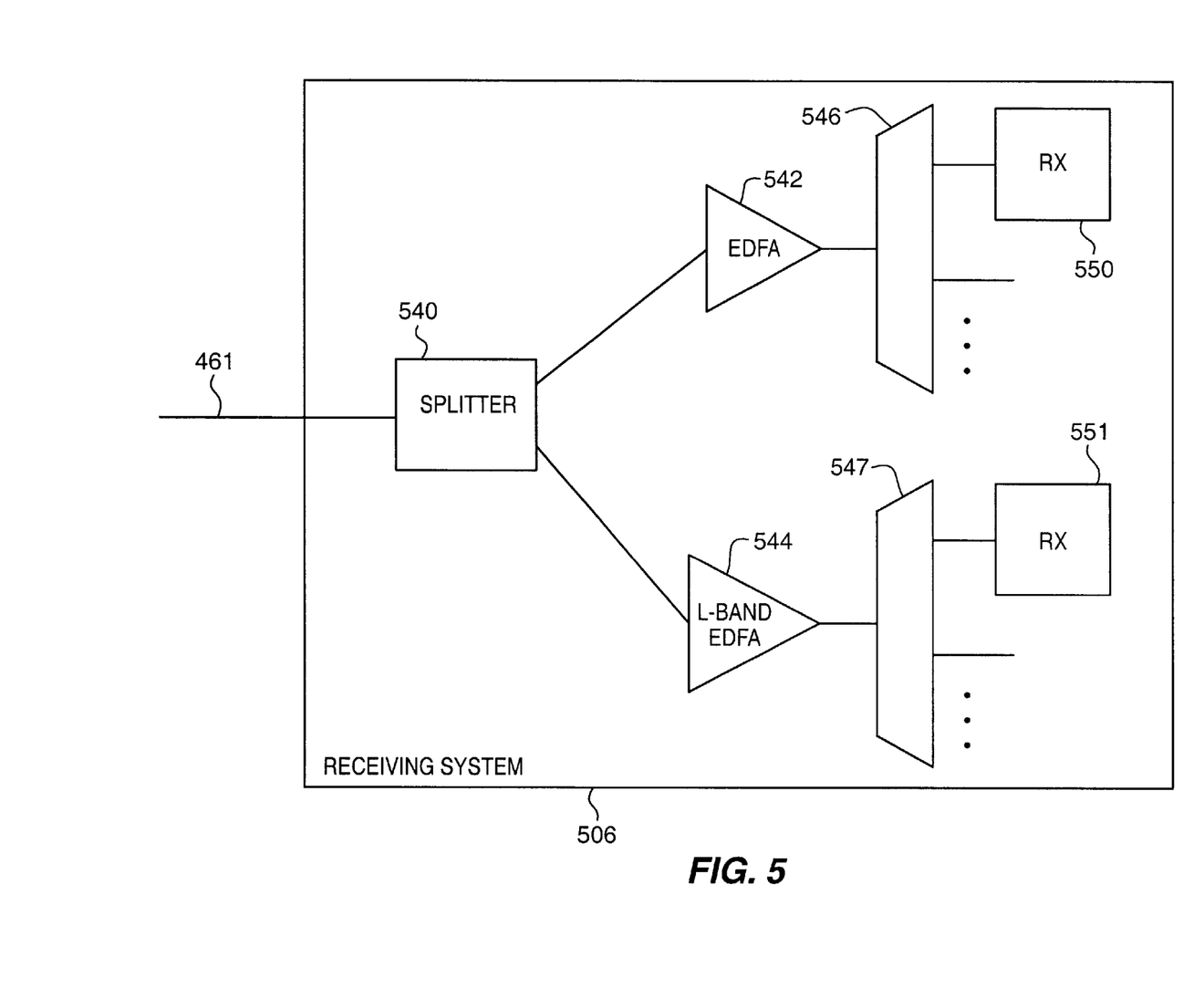
FIG. 5 is a block diagram depicting a receiving system in an example of the invention.

Fiber Optic System with a Pump Laser Configuration and Operation—FIGS. 3–5

FIGS. 3–5 depict an example of a fiber optic system in accord with the present invention. Those skilled in the art will appreciate numerous variations from this example that do not depart from the scope of the invention. Those skilled in the art will also appreciate that various features could be combined to form multiple variations of the invention.

FIG. 3 shows an example of a transmitting system 302 in accord with the present invention. Transmitting system 302 is comprised of transmitters 308–309, multiplexers 312–313, an Erbium-Doped Fiber Amplifier (EDFA) 316, an L-band EDFA 318, and a coupler 320. Transmitter 308 is coupled to multiplexer 312. Multiplexer 312 is coupled to EDFA 316. EDFA 316 is coupled to coupler 320. Transmitter 309 is coupled to multiplexer 313. Multiplexer 313 is coupled to L-band EDFA 318. L-band EDFA 318 is coupled to coupler 320. Coupler is coupled to a conventional single mode fiber 360.

FIG. 4 depicts an example of an amplification system 404 in accord with the present invention. Amplification system 404 is comprised of a signal processing system 470 and a laser system 472. Signal processing system 470 is comprised of a splitter 430, an Erbium-doped fiber 432, a conventional transmission fiber 434, and a coupler 436. Laser system 472 is comprised of a pump laser 438. Splitter 430 is coupled to fiber 360 and coupled to coupler 436 by Erbium-doped fiber 432 and transmission fiber 434. Coupler 436 is coupled to a conventional single mode fiber 461. Pump laser 438 is also coupled to fiber 461.

FIG. 5 shows an example of a receiving system 506 in accord with the present invention. Receiving system 506 is comprised of a splitter 540, an EDFA 542, an L-band EDFA 544, de-multiplexers 546–547, and receivers 550–551. Splitter 540 is coupled to fiber 461, EDFA 542, and L-band EDFA 544. EDFA 542 is coupled to de-multiplexer 546. De-multiplexer 546 is coupled to receiver 550. L-band EDFA 544 is coupled to de-multiplexer 547. De-multiplexer 547 is coupled to receiver 551.

Transmitting system 302 utilizes Wavelength Division Multiplexing (WDM) to transmit signals over separate wavelengths. Transmitting system 302 is configured to transmit an optical signal that includes a C-band and L-band. The C-band refers to a range of wavelengths of approximately 1525 nm–1560 nm. The L-band refers to a range of wavelengths of approximately 1565 nm–1600 nm. Laser system 472 is configured to generate and transfer a single laser signal. Signal processing system 470 is configured receive the optical signal that includes the C-band and L-band, receive the laser signal from the laser system 472, combine the optical signal and the laser signal to amplify the C-band and L-band of the optical signal, and transfer the optical signal that includes an amplified C-band and L-band. Receiving system 506 is configured to receive the optical signal that includes the amplified C-band and L-band.

In operation in FIG. 3, transmitter 308 transmits a first channel signal to multiplexer 312. The first channel signal is an OC-192 signal transmitted over a channel in the C-band. The C-band typically includes 40 channels. Transmitter 308 typically transmits at a rate of 10 Gbits/s, but alternatively can transmit at a rate of 40 Gbits/s. Multiplexer 312 receives the first channel signal from transmitter 308 and other channel signals in the C-band. The other transmitters that transmit the other channel signals in the C-band are not shown in FIG. 3 and are not discussed for the sake of simplicity. Multiplexer 312 multiplexes the first channel signal and the other channel signals in the C-band to generate a C-band signal. Multiplexer 312 transfers the C-band signal to EDFA 316. EDFA 316 amplifies the C-band signal and transfers the C-band signal to coupler 320.

Transmitter 309 transmits a second channel signal to multiplexer 313. The second channel signal is an OC-192 signal transmitted over a channel in the L-band. The L-band typically includes 40 channels. Transmitter 309 typically transmits at a rate of 10 Gbits/s, but alternatively can transmit at a rate of 40 Gbits/s. Multiplexer 313 receives the second channel signal from transmitter 309 and other channel signals in the L-band. The other transmitters that transmit the other channel signals in the L-band are not shown in FIG. 3 and are not discussed for the sake of simplicity. Multiplexer 313 multiplexes the second channel signal and the other channel signals in the L-band to generate an L-band signal. Multiplexer 313 transfers the L-band signal to L-band EDFA 318. L-band EDFA 318 is a discrete fiber amplifier, such as a Tellurite based EDFA or an Erbium fiber co-doped with Phosphorus and Aluminum. L-band EDFA 318 amplifies the L-band signal and transfers the L-band signal to coupler 320.

Coupler 320 receives the C-band signal and the L-band signal. Coupler 320 combines the C-band signal and the L-band signal producing the optical signal that includes the C-band and L-band. Coupler 320 transfers the optical signal over fiber 360.

In FIG. 4, splitter 430 receives the optical signal over fiber 360, splits the optical signal, and transfers the optical signal over Erbium-doped fiber 432 and transmission fiber 434. Concurrently, pump laser 438 generates the single laser signal and transfers the laser signal through coupler 436 and over Erbium-doped fiber 432 and transmission fiber 434 in an opposite direction of the optical signal. Pump laser 438 is a high power cladding pumped fiber laser transmitting the laser signal at a wavelength of approximately 1480 nm. In Erbium-doped fiber 432, the optical signal and the laser signal combine to amplify the C-band of the optical signal. The combining of the optical signal and the laser signal is based on the Erbium properties of Erbium-doped fiber 432 and is referred to as an Erbium gain. In transmission fiber 434, the optical signal and the laser signal combine to amplify the L-band of the optical signal. The combining of the optical signal and the laser signal is based on the Raman effect and is referred to as a Raman gain.

The power of the pump laser 438 is adjusted to get enough power to generate the Raman gain and the Erbium gain. The power of pump laser 438 is optimized when there is enough power to generate the Raman gain, and just enough residual power remains to generate the Erbium gain. The optimal power of pump laser 438 is determined through experimentation or simulation.

Coupler 436 receives the optical signal that includes an amplified C-band over Erbium-doped fiber 432 and the optical signal that includes an amplified L-band over transmission fiber 434. Coupler 436 combines the optical signal that includes the amplified C-band and the optical signal that includes the amplified L-band producing the optical signal that includes the amplified C-band and L-band. Coupler 436 transfers the optical signal over fiber 461.

In FIG. 5, splitter 540 receives the optical signal that includes the amplified C-band and L-band over fiber 461. Splitter 540 splits the optical signal and transfers the optical signal to EDFA 542 and L-band EDFA 544. EDFA 542 receives and amplifies the optical signal, and transfers the optical signal to de-multiplexer 546. De-multiplexer 546 separates the first channel signal out of the optical signal, and transfers the first channel signal to receiver 550. L-band EDFA 544 also receives and amplifies the optical signal, and transfers the optical signal to de-multiplexer 547. L-band EDFA 544 is a discrete fiber amplifier, such as a Tellurite based EDFA or an Erbium fiber co-doped with Phosphorus and Aluminum. De-multiplexer 547 separates the second channel signal out of the optical signal, and transfers the second channel signal to receiver 551.

This example depicts a single span configuration. A span is a length of fiber between two fiber amplifiers. In a multiple-span network, amplification system 404 is implemented on each span.

Amplification system 404 is an advance in the art by amplifying both the C-band and L-band of the optical signal using the single pump laser 438. Amplification system 404 reduces the cost of a fiber optic system by eliminating the need for two pump lasers to amplify the C-band and L-band. Amplification system 404 further reduces a need for conventional amplifiers to increase the gain of the C-band of the optical signal Fiber Optic System that amplifies an L-band Configuration and Operation—FIG. 6

Figure 6:
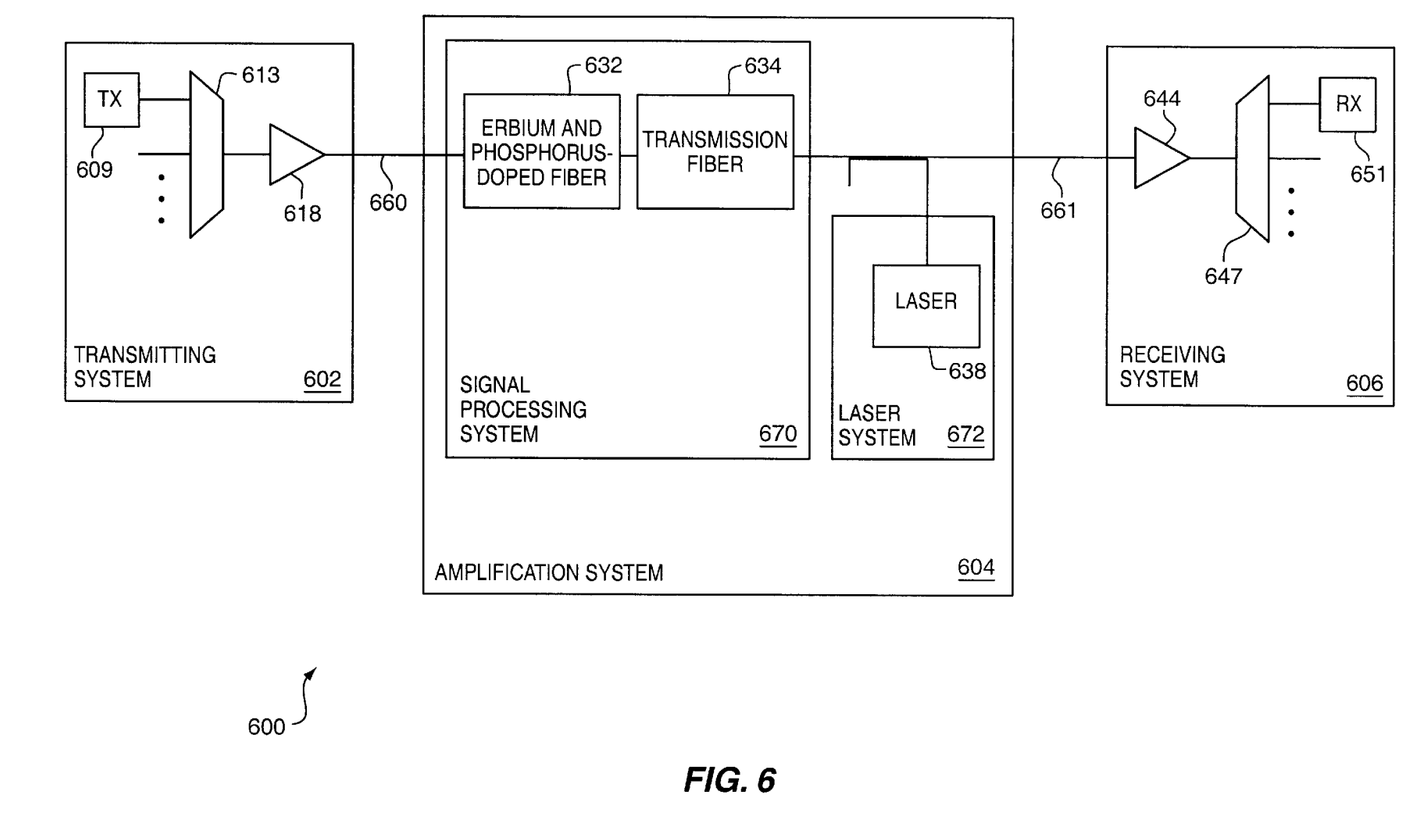
FIG. 6 is a block diagram depicting a fiber optic system that amplifies an L-band of an optical signal in an example of the invention.

FIG. 6 depicts an example of a fiber optic system 600 implementing an amplification system 604 in accord with the present invention. Those skilled in the art will appreciate numerous variations from this example that do not depart from the scope of the invention. Those skilled in the art will also appreciate that various features could be combined to form multiple variations of the invention.

Fiber optic system 600 is comprised of a transmitting system 602, amplification system 604, and a receiving system 606. Transmitting system 602 is comprised of a transmitter 609, a multiplexer 613, and an L-band EDFA 618. Amplification system 604 is comprised of a signal processing system 670 and a laser system 672. Signal processing system 670 is comprised of a section of Erbium and Phosphorus doped fiber 632 and a section of conventional transmission fiber 634. Laser system 672 is comprised of a pump laser 638. Receiving system is comprised of an L-band EDFA 644, a de-multiplexer 647, and a receiver 651.

Transmitter 609 is coupled to multiplexer 613. Multiplexer 613 is coupled to L-band EDFA 618. L-band EDFA 618 is coupled to the section Erbium and Phosphorus doped fiber 632 of by a conventional single mode fiber 660. The section of Erbium and Phosphorus doped fiber 632 is coupled to the section of transmission fiber 634. The section of transmission fiber 634 is coupled to L-band EDFA 644 by a convention single mode fiber 661. Pump laser 638 is also coupled to fiber 661. L-band EDFA 644 is coupled to de-multiplexer 647. De-multiplexer 647 is coupled to receiver 651.

Fiber optic system 600 utilizes Wavelength Division Multiplexing (WDM) to transmit signals over separate wavelengths. Transmitting system 602 is configured to transmit an optical signal that includes an L-band. The L-band refers to a range of wavelengths of approximately 1565 nm–1600 nm. Laser system 672 is configured to generate a single laser signal and transfer the laser signal to signal processing system 670. Signal processing system 670 is configured receive the optical signal that includes the L-band, receive the laser signal from the laser system 672, combine the optical signal and the laser signal to amplify the L-band of the optical signal, and transfer the optical signal that includes an amplified L-band. Receiving system 606 is configured to receive the optical signal that includes the amplified L-band.

In operation, transmitter 609 transmits a first channel signal to multiplexer 613. The first channel signal is an OC-192 signal transmitted over a channel in the L-band. The L-band typically includes 40 channels. Transmitter 609 typically transmits at a rate of 10 Gbits/s, but alternatively can transmit at a rate of 40 Gbits/s. Multiplexer 613 receives the first channel signal from transmitter 609 and other channel signals in the L-band. The other transmitters that transmit the other channel signals in the L-band are not shown in FIG. 6 and are not discussed for the sake of simplicity. Multiplexer 613 multiplexes the first channel signal and the other channel signals in the L-band to generate an optical signal that includes the L-band. Multiplexer 613 transfers the optical signal to L-band EDFA 618. L-band EDFA 618 is a discrete fiber amplifier, such as a Tellurite based EDFA or an Erbium fiber co-doped with Phosphorus and Aluminum. L-band EDFA 618 amplifies the optical signal and transfers the optical signal over fiber 660.

The optical signal propagates over the section of Erbium and Phosphorus doped fiber 632 and the section of transmission fiber 634. Concurrently, pump laser 638 transfers the laser signal over fiber 661 and over the section of Erbium and Phosphorus doped fiber 632 and the section of transmission fiber 634 in an opposite direction of the optical signal. Those skilled in the art will appreciate that the section of transmission fiber 634 could be fiber 661 or fiber 660. Pump laser 638 is a high power cladding pumped fiber laser transmitting the laser signal at a wavelength of approximately 1480 nm. In the section of Erbium and Phosphorus doped fiber 632, the optical signal and the laser signal combine to amplify the L-band of the optical signal. The combining of the optical signal and the laser signal is based on the properties of the section of Erbium and Phosphorus doped fiber 632 and is referred to as an Erbium and Phosphorus gain. In the section of transmission fiber 634, the optical signal and the laser signal combine to amplify the L-band of the optical signal. The combining of the optical signal and the laser signal is based on the Raman effect and is referred to as a Raman gain. The Raman gain is well known in the art.

A combination of the Raman gain and the Erbium and Phosphorus gain flattens the gain shape of the L-band of the optical signal. The Erbium and Phosphorus gain has a gain dip around 1580 nm. The Raman gain peak is at 1580 nm. Therefore, the combination of the Raman gain and the Erbium and Phosphorus gain acts to flatten the overall gain shape of the L-band.

The power of the pump laser 638 is adjusted to get enough power to generate the Raman gain and the Erbium and Phosphorus gain. The power of pump laser 638 is optimized when there is enough power to generate the Raman gain, and just enough residual power remains to generate the Erbium and Phosphorus gain. The optimal power of pump laser 638 is determined through experimentation or simulation.

L-band EDFA 644 receives the optical signal that includes the amplified L-band. L-band EDFA 644 is a discrete fiber amplifier, such as a Tellurite based EDFA or an Erbium fiber co-doped with Phosphorus and Aluminum. L-band EDFA 644 amplifies the optical signal and transfers the optical signal to de-multiplexer 647. De-multiplexer 647 separates the first channel signal out of the optical signal and transfers the first channel signal to receiver 651.

This example depicts a single span configuration. A span is a length of fiber between two fiber amplifiers. In a multiple-span network, amplification system 604 is implemented on each span.

Amplification system 604 advantageously amplifies the L-band of the optical signal resulting in a flattened gain shape. The prior art requires a gain equalization filter to flatten the L-band gain shape. Amplification system 604 combines the Raman gain and the Erbium and Phosphorus gain to generate the flattened gain shape, and eliminates a need for the gain equalization filter.

Those skilled in the art will appreciate variations of the above-described embodiments that fall within the scope of the invention. As a result, the invention is not limited to the specific examples and illustrations discussed above, but only by the following claims and their equivalents.

We claim:

1. A method of amplifying a C-band and L-band of an optical signal, the method comprising:
   (a) receiving the optical signal that includes the C-band and the L-band;
   (b) combining the optical signal and only a single laser signal to amplify both the C-band and the L-band of the optical signal; and
   (c) transmitting the optical signal that includes an amplified C-band and L-band.

2. The method in claim 1 further including receiving the laser signal.

3. The method in claim 1 further including generating the laser signal.

4. The method in claim 1 wherein the laser signal has a wavelength of approximately 1480 nm.

5. The method in claim 1 wherein step (b) further comprises splitting the optical signal and transferring the optical signal over a first fiber and a second fiber.

6. The method in claim 5 further comprising combining the optical signal and the laser signal in the first fiber to amplify the C-band of the optical signal.

7. The method in claim 6 further comprising combining the optical signal and the laser signal in the second fiber to amplify the L-band of the optical signal.

8. The method in claim 7 further comprising combining the optical signal that includes an amplified C-band and the optical signal that includes an amplified L-band.

9. An optical signal amplification system, comprising:
   a laser system configured to receive and transfer only a single laser signal; and
   a signal processing system coupled to the laser system and configured to receive an optical signal that includes a C-band and L-band, receive only the single laser signal from the laser system, combine the optical signal and the single laser signal to amplify both the C-band and the L-band of the optical signal, and transfer the optical signal that includes an amplified C-band and L-band.

10. The amplification system in claim 9 wherein the laser system comprises a pump laser configured to generate the single laser signal.

11. The amplification system in claim 10 wherein the pump laser is configured to transmit the single laser signal in an opposite direction to the optical signal.

12. The amplification system in claim 9 wherein the single laser signal has a wavelength of approximately 1480 nm.

13. The amplification system in claim 9 wherein the signal processing system comprises:
   a splitter configured to receive the optical signal that includes the C-band and the L-band and split the optical signal;
   a first fiber coupled to the splitter and configured to receive the optical signal and the single laser signal, and combine the optical signal and the single laser signal to amplify the C-band of the optical signal;
   a second fiber coupled to the splitter and configured to receive the optical signal and the single laser signal, and combine the optical signal and the single laser signal to amplify the L-band of the optical signal; and
   a coupler coupled to the first fiber and the second fiber and configured to receive the optical signal that includes an amplified C-band over the first fiber and the optical signal that includes an amplified L-band over the second fiber, and combine the optical signal that includes the amplified C-band with the optical signal that includes the amplified L-band.

14. The amplification system in claim 13 wherein the first fiber is an Erbium-doped fiber.

15. The amplification system in claim 13 wherein the second fiber is a transmission fiber.

16. The amplification system in claim 15 wherein the second fiber combines the optical signal and the single laser signal based on a Raman effect.

* * * * *